United States Patent [19]

Blackburn et al.

[11] 4,357,713
[45] Nov. 2, 1982

[54] METHOD AND APPARATUS FOR REDUCTION OF MODAL NOISE IN FIBER OPTIC SYSTEMS

[75] Inventors: James C. Blackburn, Adelphi, Md.; Jonathan Vanderwall, Washington, D.C.

[73] Assignee: The United States of America as represented by the Secretary of the Army, Washington, D.C.

[21] Appl. No.: 74,634

[22] Filed: Sep. 12, 1979

[51] Int. Cl.$^3$ .............................. H04B 9/00
[52] U.S. Cl. ........................... 455/609; 455/613
[58] Field of Search ............ 455/609, 613, 611; 307/311, 312; 332/7.51; 331/94.5 H, 94.5 M

[56] References Cited

U.S. PATENT DOCUMENTS

| 3,743,969 | 7/1973 | Hutchings | 332/7.51 |
| 4,032,802 | 6/1977 | Pan et al. | 307/311 |
| 4,101,847 | 7/1978 | Albanese | 307/312 |
| 4,102,572 | 7/1978 | O'Meara | 332/7.51 |

FOREIGN PATENT DOCUMENTS 2330310  1/1975  Fed. Rep. of Germany .... 331/94.5 H

OTHER PUBLICATIONS

G. P. Worth–The Phenomenon of Modal Noise in Analoque and Digital Optical Fiber System—1978 Standard Telecommunication Labs. Ltd., pp. 492-501.

*Primary Examiner*—Joseph A. Orsino, Jr.
*Attorney, Agent, or Firm*—Nathan Edelberg; Robert P. Gibson; Saul Elbaum

[57] ABSTRACT

A dithering means is applied to a laser diode to provide dither modulation along with a signal input thereto. Modal noise, otherwise generated by the system, is reduced by the introduction of dither modulation.

8 Claims, 6 Drawing Figures

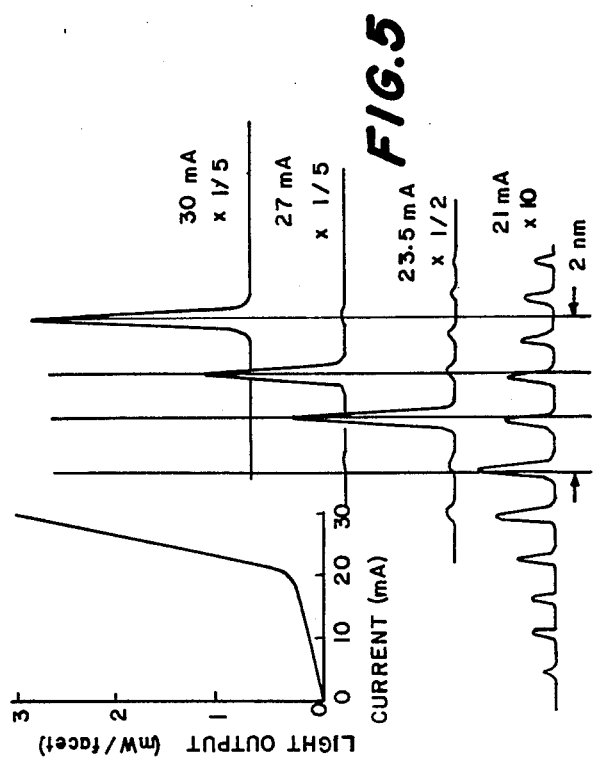
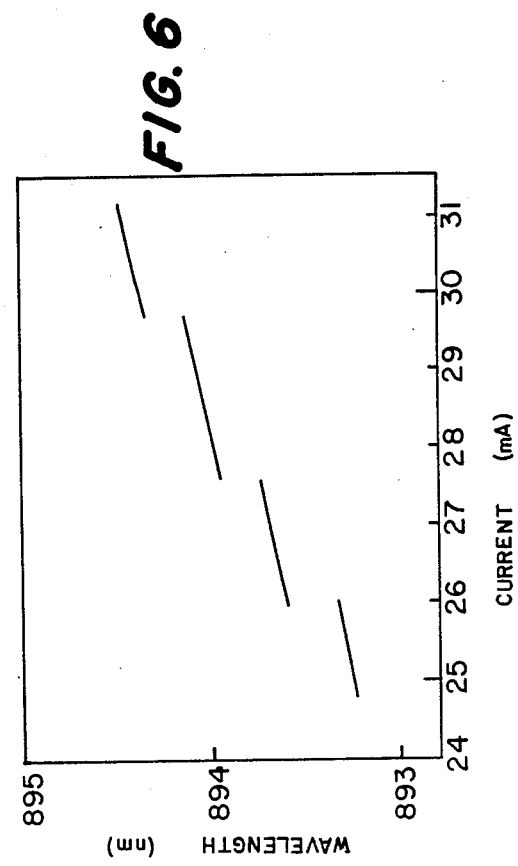
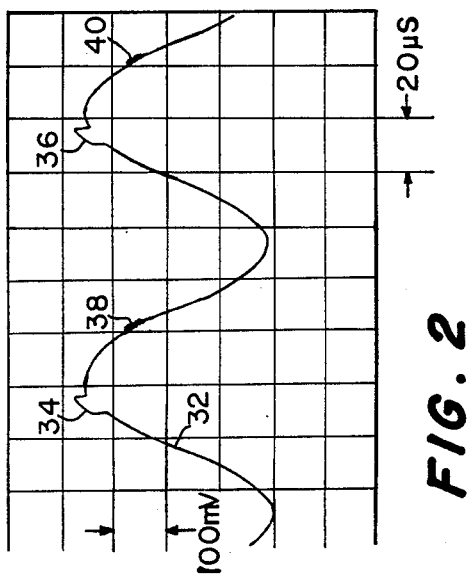
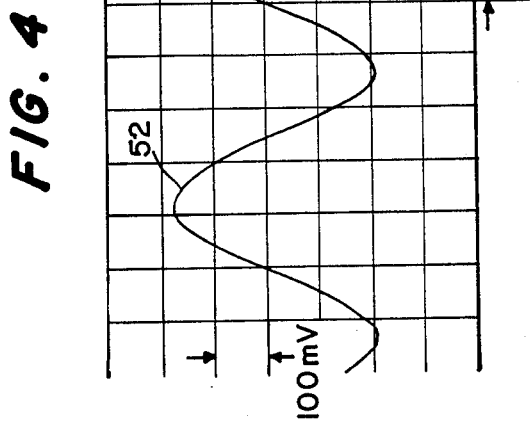

METHOD AND APPARATUS FOR REDUCTION OF MODAL NOISE IN FIBER OPTIC SYSTEMS

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The invention relates to fiber optic signal systems, and more particularly to reduction of the distortions produced by modal noise in such systems.

2. Prior Art

Recently published literature describes a hitherto unconsidered source of noise in multi-mode fiber optic systems which use single-mode or other narrow band laser sources. The recently recognized form of interference has been called modal noise, appearing as undesired amplitude modulation of a signal received from the system. The modal noise was described by Epworth, at the Fourth European Conference On Optical Fiber Communication, 1978 in a paper "The Phenomenon of Modal Noise in Analog and Digital Optical Fiber Systems." The phenomenon has more recently been described by Epworth in a paper delivered on Mar. 8, 1979 at a meeting of the Optical Soceity of America in Washington, D.C.

With the exception of a suggestion by Epworth that the best solution for the modal noise problem would be development of a new generation of wide-band emission linear lasers, no disclosures have been made of any practical method or apparatus for adequately reducing such noise.

The present invention provides a means for reduction of such modal noise not previously available in the prior art.

SUMMARY OF THE INVENTION

It is accordingly an object of the invention to overcome the deficiencies of prior art fiber optic systems which tend to generate modal noise.

It is more specifically an object of the invention to provide a means for reducing unwanted amplitude modulation in signals received from multi-mode fiber systems.

Still a further object of the invention is a reduction in the distortion of signals transmitted by fiber optics caused by interference effets exacerbated by narrow spectral widths of single mode lasers.

Yet another object of the invention is the reduction of noise generated at an interface between coupled fibers in a fiber optic system.

It is yet another object of the invention to reduce step discontinuities appearing in a signal received from a fiber optic system.

The present invention overcomes the problems of the prior art and meets the above-stated objectives by the addition of a dither modulation source to a biasing circuit of a laser diode.

These and other objects, features, and advantages of the present invention will become more readily apparent from the following specification and appended claims, when considered in conjunction with the attached drawings.

BRIEF DESCRIPTION OF THE DRAWINGS

FIG. 2 shows a signal as transmitted by the prior art system.

FIG. 4 shows a signal transmitted by the system of FIG. 3.

FIG. 5 shows radiation spectra for a particular laser diode used in the circuit of FIG. 3.

FIG. 6 shows the current dependence of peak wavelength of the laser of FIG. 3.

DETAILED DESCRIPTION OF THE PREFERRED EMBODIMENT

Figure 1:
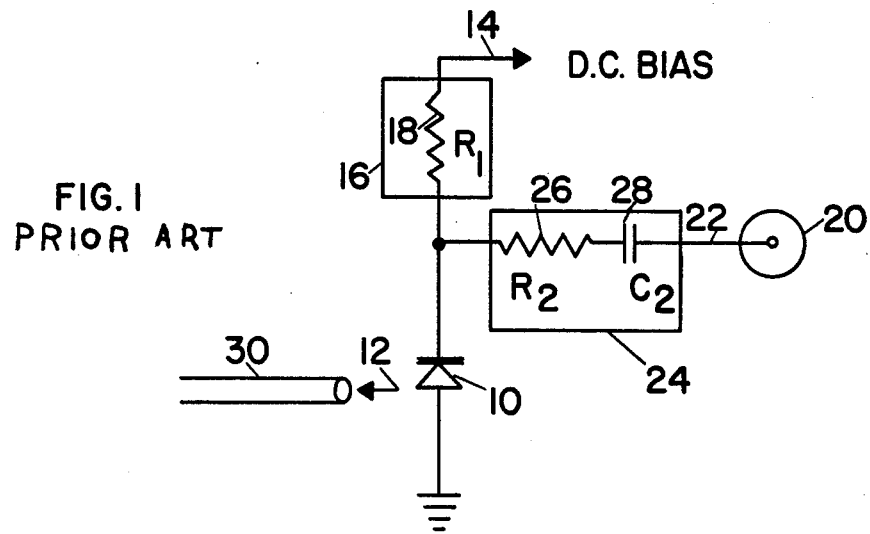
FIG. 1 shows a typical prior art fiber optic signal system.

A typical prior art fiber optic signal system is shown in FIG. 1 and includes a laser diode 10 emitting coherent radiation symbolically shown at 12.

A DC biasing circuit, not shown but well known to those skilled in the art, provides a DC biasing voltage or current on lead 14 to provide an operating point for diode 10. The biasing voltage is applied to the laser diode by a first coupling network 16, typically comprising a resistor 18 thrugh other circuits may be used. A signal source (not shown) is connected to an input 20 and provides a particular signal for the laser along lead 22. The signal is coupled to the laser by a second coupling network 24, typically comprising a resistor 26 and a capacitor 28, though other coupling circuits may be used.

The laser diode, at an operating point established by the DC bias on lead 14, emits coherent radiation responsive to the signal on lead 22. The output radiation is transmitted on an optical fiber 30 and received by a detector (not shown).

In response to a typical sinusoidal input at 20, the received signal may take the shape of a waveform 32 as shown in FIG. 2. The specific waveform shown in FIG. 2 is a 10 kHz signal transmitted through 1 km of graded index fiber. As seen in FIG. 2, undesirable amplitude modulation is present, shown as 34 and 36, for example. Other distortion is similarly received, as seen at 38 and 40.

As postulated by Epworth, modal noise is an amplitude modulation of the desired signal caused by interference effects acting upon the solid state laser emission. The interference is between the various optical modes propagating through the fiber 30, each of the modes subjected to different delay because of mode dispersion in the fiber. Any change in the output wavelength of laser 10, or of the transmission properties of fiber 30, will tend to alter the interference pattern within the fiber, and consequently the mode structure in the fiber. Consequently, if any mode-selective transmission property is effective on the optical signal transmitted through the fiber, an amplitude modulation is produced thereon. In fact, it is known that any bending of the fiber alters the mode structure, and any fiber connector is known to be mode selective.

As is known to those skilled in the art, a light ray, upon hitting the front fact of the fiber, is propagated at a particular mode as a function of the angle of introduction into the fiber. When two fibers are coupled, the angular distribution of light, or modes propagating in the first fiber, will not continue unaltered in the second fiber if the axes of the fibers are not completely aligned and/or the coupled faces of the fibers are not perfectly parallel. In practice, perfect alignment of the axes of the fibers, and perfect parallelism between the coupled faces are not achieved. Thus, in practical systems the requisites for producing modal noise are invariably present.

As described in the above-referenced publication, the near-field and far-field speckle patterns observed at the end of a multi-mode fiber are the key to modal noise. Specifically, the speckles are produced by interference between the several propagating modes, and the number of observed speckles is accordingly roughly proportional to the number of propagating modes.

In a misaligned joint between optical fibers it will be observed that as the speckle pattern varies, the number of speckles coupled to the second fiber will vary, thus introducing a loss uncertainty.

It is proposed in the literature that modal noise can be reduced by reduction of source coherence, specifically by providing a new generation of wide-band emission linear lasers. The present invention, however, reduces source coherence by utilizing the wavelength-current dependence of laser diodes. Specifically, the wavelength of the laser is continuously swept by application of a high frequency "dither signal" to the laser, thus producing a less coherent source. The modulating dither signal minimum frequency is the Nyquist rate for the transmitted signal, and is further determined by the response band of the optical receiver. That is, the dither signal frequency is preferably above the optical receiver response band.

The invention does not rely solely on the reduction of source coherence to suppress the effect of modal noise. When modal noise is present (i.e., when the speckle pattern changes in response to the differing modes which are being coupled through the system) the photocurrent in the detector varies both with the desired modulation and with the instantaneous speckle pattern. If, however, the speckle pattern is caused to vary rapidly by dithering, preferably at a rate so high that the detector cannot respond to it, the component of photocurrent resulting from the modal noise will tend to be stabilized at an average value. For example, if one has a desired modulation consisting of a 500 MHz sinewave and a 2 GHZ dither modulation, then the system gain over one cycle of desired signal will be the average gain over four cycles of dither, owing to the averaging effect of the response time of the detector.

This averaging effect may also be provided by a low-pass filter inserted after the detector. Pre-detection averaging is also provided by the dispersion inherent in the optical fiber itself.

Figure 3:
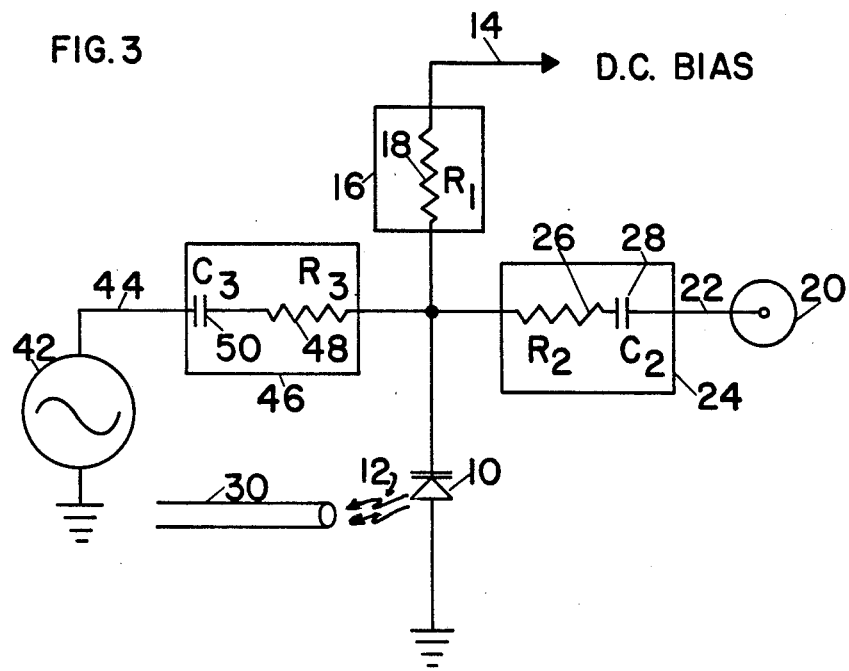
FIG. 3 shows a fiber optic system modified in accordance with the present invention.

As shown in FIG. 3, the present invention utilizes a dither modulation source 42 to provide a dither signal at lead 44, coupled by a third coupling network 46 to laser diode 10. The coupling network 46 is shown as comprising a series connection of resistor 48 and capacitor 50, through other circuits may be used as is known to those skilled in the art.

When the 10 kHz signal previously transmitted through 1 km of graded index fiber and distorted thereby is again transmitted, utilizing the circuit of FIG. 3, the resulting signal is received as shown in FIG. 4. The waveform 52 is seen to contain none of the amplitude distortion previously seen in FIG. 2.

The experiment used an analog system and was conducted with a ML 2205F transverse-junction-stripe injection laser, supplied by the Mitsubishi Electric Company. The laser, typical of the lasers used in laser systems in which modal noise is generated, was used to excite approximately 1 km of Siecor graded-index fiber of relatively low mode dispersion. One demountable butt-coupling was used to join the (manufacturer-supplied) laser pigtail to the 1 km fiber. The coupling was approximately 40 cm from the laser chip.

In both parts of the experiment the laser was biased at 44 mA, approximately 1.2 times the threshold current, and the baseband signal was a 10 mA peak-to-peak sinewave at 10 kHz. The dither added by source 42 was 2.3 GHz, at an amplitude estimated to be approximately 4 mA peak-to-peak.

The upper frequency for the receiver used in detecting the outputs shown in FIGS. 2 and 4 was 400 MHz, and dither frequencies from 1.2 GHz to 2.5 GHz were utilized experimentally, all giving similar results. The dither frequency was selected to be above the detector response frequency in order to utilize the detector for averaging the effect of launching a large number of modes in the fiber.

As is apparent from the characteristics of a typical diode, specifically the ML-2000 Series Laser Diode manufactured by Mitsubishi, shown in FIGS. 5 and 6, both the operating wavelength and the light output from the diode vary with the operating current. Specifically, FIG. 5 shows a series of radiation spectra for the diode obtained at different DC bias levels. It is seen, for example, that at 30 mA bias the emitted radiation is essentially at a single wavelength. At a bias of 21 mA, the output emissions from the diode include many different wavelengths. Different modes are thus seen to be excited in the system by changing the bias applied to the laser. FIG. 6 further illustrates the current dependence of peak wavelength emitted by the diode.

It is noted that even in a stable, single mode laser, the laser frequency is varied slightly in response to the modulation current itself. The very act of modulating the laser thus tends to produce modal noise. At low modulation frequencies (e.g., below 1 MHz or so) the temperature and dimensions of the laser cavity may vary with modulation, thus producing considerable wavelength variation and much modal noise.

The present invention, by changing the bias in response to the dither modulation source 42, causes the laser frequency to change continuously. Such a constant change in wavelength reduces the coherence of the laser, and creates an averaging effect, thus providing a reduction in modal noise for currently existing lasers.

We wish it to be understood that we do not desire to be limited to the exact details of construction shown and described, for obvious modifications can be made by a person skilled in the art.

What is claimed is:

1. An analogue optical signal system with reduced modal noise comprising:
    a source for generating an optical output signal linearly related to a high frequency wide-band input signal;
    means for applying a biasing signal to said source wherein said source is biased to operate above threshold whereby said optical signal system operates as an analogue system;
    transmission means for transmitting said output signal to a receiver; and means for applying a high frequency signal above the Nyquist rate of said transmitted signal to said biasing signal.

2. An analogue optical signal system as recited in claim 1, wherein said high frequency signal is above the optical response band of said receiver.

3. An analogue optical signal system as recited in claim 2, wherein said source for generating a linear output signal comprises an injection laser.

4. An analogue optical signal system as recited in claim 3, wherein said transmission means comprise fiber optics.

5. A method of reducing modal noise in an analogue optical signal system comprising the steps of:
 applying an input signal current to a wavelength - current dependent source of single mode optical radiation;
 applying a biasing signal to said source wherein said source is biased above the threshold whereby said source generates an optical output signal linearly related to said input signal;
 transmitting said output signal to an optical receiver; and
 modulating said biasing signal with a high frequency signal above the Nyquist rate of said transmitted output signal.

6. A method, as recited in claim 5, wherein said high frequency signal is above the optical response band of said optical receiver.

7. A method, as recited in claim 6, wherein said source of single mode optical radiation comprises an injection laser.

8. A method, as recited in claim 7, wherein the step of transmitting is accomplished via fiber optics.

* * * * *